(12) United States Patent
Zhu et al.

(10) Patent No.: US 12,254,368 B2
(45) Date of Patent: Mar. 18, 2025

(54) SMART CARD

(71) Applicant: Giesecke+Devrient ePayments GmbH, Munich (DE)

(72) Inventors: Wensheng Zhu, Hubei (CN); Chen Fang, Hubei (CN); Dunpu Wang, Hubei (CN)

(73) Assignee: GIESECKE+DEVRIENT EPAYMENTS GMBH, Munich (DE)

( * ) Notice: Subject to any disclaimer, the term of this patent is extended or adjusted under 35 U.S.C. 154(b) by 0 days.

(21) Appl. No.: 18/686,328

(22) PCT Filed: Aug. 22, 2022

(86) PCT No.: PCT/CN2022/113935
§ 371 (c)(1),
(2) Date: Feb. 23, 2024

(87) PCT Pub. No.: WO2023/025094
PCT Pub. Date: Mar. 2, 2023

(65) Prior Publication Data
US 2024/0394499 A1 Nov. 28, 2024

(30) Foreign Application Priority Data
Aug. 26, 2021 (CN) .......................... 202122034543.3

(51) Int. Cl.
*G06K 19/077* (2006.01)
(52) U.S. Cl.
CPC .............................. *G06K 19/07705* (2013.01)
(58) Field of Classification Search
CPC ............................................... G06K 19/07705

USPC ......................................................... 235/380
See application file for complete search history.

(56) References Cited

U.S. PATENT DOCUMENTS

| 6,082,622 A * | 7/2000 | Hartmann | G16H 10/60 235/382 |
| 8,030,745 B2 * | 10/2011 | Yamazaki | G06K 19/0723 257/679 |
| 10,810,570 B1 * | 10/2020 | Martin | G06F 21/88 |
| 2008/0296606 A1 * | 12/2008 | Ottobon | G06K 19/07749 257/E33.059 |

(Continued)

FOREIGN PATENT DOCUMENTS

| CN | 201616111 U | 10/2010 |
| CN | 205193854 U | 4/2016 |

(Continued)

OTHER PUBLICATIONS

International Search Report from corresponding PCT Application No. PCT/CN2022/113935, Nov. 22, 2022.

*Primary Examiner* — Michael G Lee
*Assistant Examiner* — David Tardif
(74) *Attorney, Agent, or Firm* — Workman Nydegger

(57) ABSTRACT

A smart card, has a central area and an edge area surrounding the central area including a first protection layer, a function layer and a second protection layer which are sequentially stacked. The function layer comprises: a read-write module and a light-emitting module. The smart card facilitates the user to know a use state of the smart card, thereby largely avoiding the user from making payment or repeating payment without knowledge, which facilitates ensuring property safety.

10 Claims, 1 Drawing Sheet

(56) References Cited

U.S. PATENT DOCUMENTS

2015/0053772 A1\* 2/2015 Holweg ............ G06K 19/07794
                                                                          235/492
2015/0317553 A1\* 11/2015 Pueschner ............ G06K 19/077
                                                                          235/492
2019/0213460 A1\* 7/2019 Finkenzeller .... G06K 19/07773
2020/0184296 A1\* 6/2020 Oliver .................. G06Q 20/341

FOREIGN PATENT DOCUMENTS

| CN | 207704474 U | 8/2018 |
| --- | --- | --- |
| CN | 110868777 A | 3/2020 |
| CN | 211403469 U | 9/2020 |
| CN | 113222094 A | 8/2021 |
| CN | 215814237 U | 2/2022 |

\* cited by examiner

SMART CARD

TECHNICAL FIELD

The application relates to the technical field of financial payment and transportation transaction cards, and in particular, relates to a smart card.

BACKGROUND

During the normal use of traditional payment cards, it can only be judged whether the transaction is completed by observing the displayed content on the card reader or listening to the sound of the card reader. If there is any deduction made by a non-standard card reader without displaying or sound indication from the card reader, the card holder cannot get to know the deduction, or he/she may even swipe the card many times, resulting in property losses.

SUMMARY

The embodiments of the application provide a smart card, which facilitates the user to know whether the smart card is used or not, thus ensuring property safety.

In order to solve the above problems, the embodiments of this application provide a smart card which comprises a central area and an edge area around the central area comprising a first protection layer, a function layer and a second protection layer which are sequentially stacked, wherein the function layer comprises: a read-write module, comprising a first chip and a first coil, wherein the first chip is located in the central area, and the first coil comprises a first winding part around the central area and first electrical connection terminals extending from the first winding part to the central area, and the first electrical connection terminals are electrically connected with the first chip; a light-emitting module, comprising a second chip, a second coil and controlled light sources, wherein the second chip is located in the central area, and the second coil comprises a second winding part arranged around the central area and second electrical connection terminals extending from the second winding part to the central area, wherein the second winding part is insulated from the first winding part, the second electrical connection terminals and the controlled light sources are electrically connected with the second chip respectively, and the second chip is used to control a light-emitting state of the controlled light sources.

In some embodiments, the function layer comprises a first coil layer and a second coil layer which are stacked, wherein the first coil layer is located between the second coil layer and the first protection layer; the first winding part is located in the first coil layer, the second winding part, the controlled light sources and the second chip are located in the second coil layer, and the controlled light sources and the second chip partially extend to the first coil layer.

In some embodiments, the second coil layer is provided with a mounting hole, a side of the first coil layer close to the second coil layer is provided with an avoidance hole, and the second chip and the controlled light sources are located in the mounting hole and partially extend to the avoidance hole.

In some embodiments, the light-emitting module further comprises a circuit board arranged in the mounting hole, and the second chip and the controlled light sources are electrically connected to the circuit board.

In some embodiments, an orthogonal projection of the first winding part on the second coil layer is arranged around the periphery of the second winding part, or, the orthogonal projection of the first winding part on the second coil layer covers the second winding part, or, the orthogonal projection of the first winding part on the second coil layer partially covers the second winding part along a circumferential direction of the second winding part.

In some embodiments, the first winding part is arranged around the periphery of the second winding part.

In some embodiments, a number of the controlled light sources is multiple, and the light-emitting state comprises at least one of light-emitting sequence, light-emitting duration, light-emitting color, flickering frequency or luminance of different controlled light sources.

In some embodiments, the smart card further comprises a first printed layer and a second printed layer, wherein the first printed layer is located between the first protection layer and the function layer, and the second printed layer is located between the function layer and the second protection layer.

In some embodiments, the first printed layer comprises a first light-shielding part and a first light-transmitting part, and the first light-transmitting part is arranged in an orthogonal projection area of the light-emitting module on the first printed layer; and/or, the second printed layer comprises a second light-shielding part and a second light-transmitting part, and the second light-transmitting part is arranged in an orthogonal projection area of the light-emitting module on the second printed layer.

In some embodiments, the function layer further comprises a third protection layer and a fourth protection layer, the third protection layer is located on one side of the first printed layer away from the first protection layer, and the fourth protection layer is located on one side of the second printed layer away from the second protection layer.

According to the smart card provided by the embodiments of this application, a light-emitting module is arranged on the function layer, so that when a cardholder is in payment or other usage scenarios requiring identity identification, the light-emitting module can give a prompt whether identity identification or payment has been made by the user, which greatly facilitates the user to know the use state of the smart card, thereby largely avoiding the user from making payment or repeating payment without knowledge, so it is conducive to reducing property losses and ensuring property safety.

BRIEF DESCRIPTION OF THE DRAWINGS

The features, advantages and technical effects of exemplary embodiments of this application will be described below with reference to the accompanying drawings.

REFERENCE NUMBER

1. Central Area;
2. Edge Area;
3. First Protection Layer;
4. Function Layer;
41. Read-Write Module; 411. First Chip; 412. First Coil; 413. First Winding Part; 414. First Electrical Connection Terminal; 42. Light-emitting Module; 421. Second Chip; 422. Second Coil; 423. Controlled Light Source; 424. Second Winding Part; 425. Second Electrical Connection Terminal; 426. Circuit Board; 43. First Coil Layer; 44. Second Coil Layer; 45. Third Protection Layer; 46. Fourth Protection Layer;

5. Second Protection Layer;
6. First Printed Layer;
7. Second Printed Layer.

DETAILED DESCRIPTION

The implementations of this application will be described in further detail below with reference to the drawings and embodiments. The following detailed description of the embodiments and the accompanying drawings are used to illustrate the principles of the application, but not to limit the scope of the application, i.e., the application is not limited to the described embodiments.

In the description of this application, it should be noted that unless otherwise stated, "multiple/a plurality of" means more than two; the orientation or positional relationships indicated by the terms "on", "under", "left", "right", "inside" and "outside" are only for the convenience of describing the application and simplifying the description, but do not indicate or imply that the indicated apparatus or element must be in a specific orientation, be constructed and operated in a specific orientation, and therefore cannot be understood as a limitation of the application. In addition, the terms "first", "second", "third" and so on are only used for descriptive purposes, and cannot be understood as indicating or implying relative importance.

The orientation words in the following description refer to the directions shown in the figures, and do not limit the specific structure of this application. In the description of this application, it should also be noted that the terms "mount", "connect" and "connection" should be understood in a broad sense, for example, "connection" may refer to fixed connection, detachable connection or integrated connection; it may refer to direct connection or indirect connection through an intermediate medium. For ordinary technicians in the field, the specific meanings of the above terms in this application may be understood according to specific situations.

In order to better understand this application, the embodiments of this application will be described with reference to FIG. 1 and FIG. 2.

Figure 1:
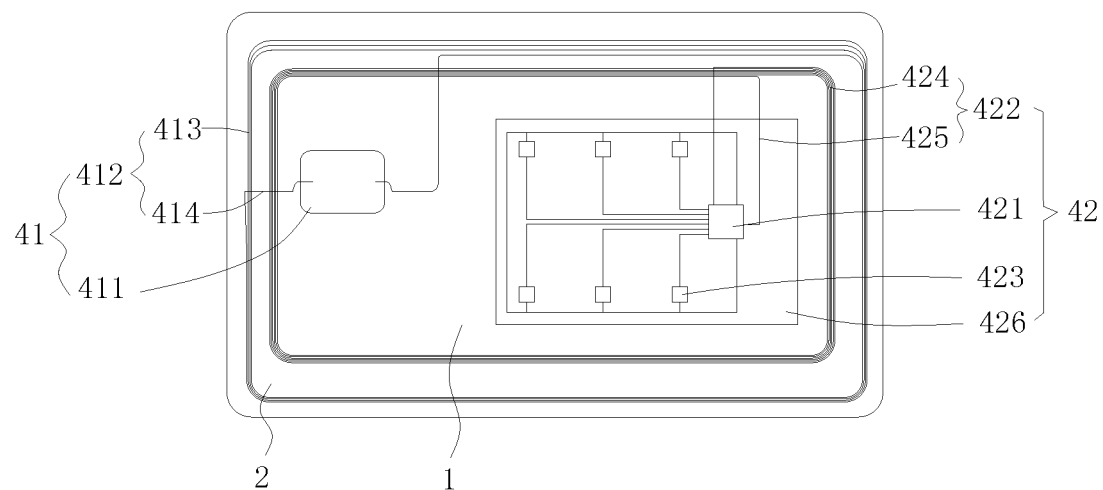
FIG. 1 is a schematic structural plan view of a smart card provided by an embodiment of this application.
Figure 2:
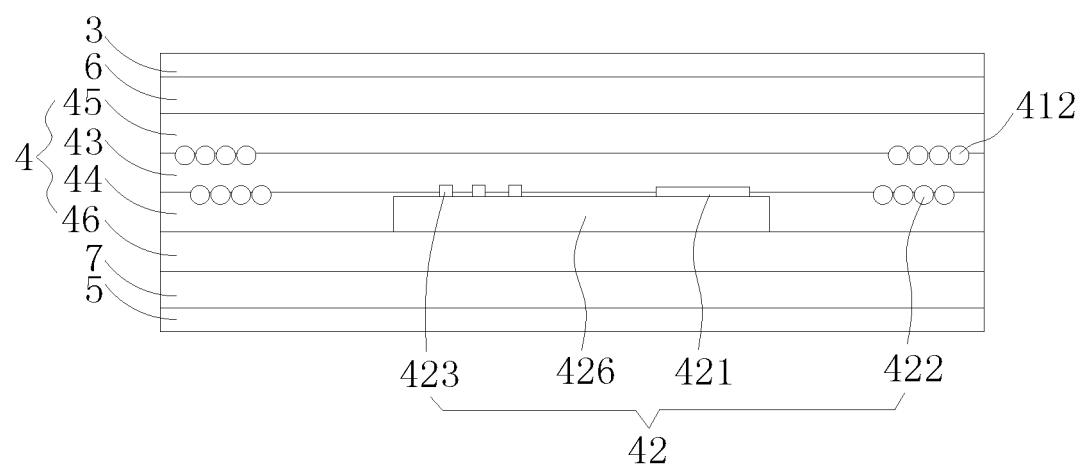
FIG. 2 is a schematic structural diagram of the smart card shown in FIG. 1 from another angle.

FIG. 1 is a schematic structural plan view of a smart card provided by an embodiment of this application, and FIG. 2 is a schematic structural diagram of the smart card shown in FIG. 1 from another angle.

Referring to FIG. 1 and FIG. 2 together, the smart card provided by the embodiments of this application comprises a central area 1 and an edge area 2 surrounding the central area 1. The smart card comprises a first protection layer 3, a function layer 4 and a second protection layer 5 which are sequentially stacked. The first protection layer 3 and the second protection layer 5 on both sides of the function layer 4 serve to protect the function layer 4. The function layer 4 comprises a read-write module 41 and a light-emitting module 42.

The read-write module 41 comprises a first chip 411 and a first coil 412. The first chip 411 is located in the central area 1. The first coil 412 comprises a first winding part 413 arranged around the central area 1 and first electrical connection terminals 414 extending from the first winding part 413 to the central area 1. The first electrical connection terminals 414 are electrically connected with the first chip 411.

The number of the first electrical connection terminals 414 is two, and the first coil 412 forms a loop with the first chip 411 through the two first electrical connection terminals 414. The read-write module 41 is used to respond to the target card reader for identity identification to determine whether the smart card is in a payment state or a state related to the payment state. Herein the state related to the payment state is, for example, the state when swiping the card to enter the station and take the subway.

Optionally, the first chip 411 may be a dual interface chip. Of course, it may also be other types of chips, such as single interface chips, which are not limited in this application.

It should be noted that the first winding part 413 is in the edge area 2, and its shape formed by surrounding the central area 1 is not limited. For example, it may be square, round, oval or other shapes. A number of turns around the first winding part 413 is not limited, and is dependent on specific application scenarios, for example, it may be one or more.

The light-emitting module 42 comprises a second chip 421, a second coil 422 and controlled light sources 423. The second chip 421 is in the central area 1, and the second coil 422 comprises a second winding part 424 arranged around the central area 1 and second electrical connection terminals 425 extending from the second winding part 424 to the central area 1. The second electrical connection terminals 425 and the controlled light sources 423 are respectively electrically connected with the second chip 421, and the second chip 421 is used to control the light-emitting state of the controlled light sources 423.

Optionally, a number of the second electrical connection terminals 425 is two, and the second coil 422 forms a loop with the second chip 421 and the controlled light sources 423 through the two second electrical connection terminals 425. The light-emitting module 42 is used to emit light when the read-write module responds to the target card reader, so as to know whether the read-write module 41 is in the payment state.

When the smart card is put close to the target card reader, the first coil 412 and the second coil 422 are simultaneously induced and transmit power to the first chip 411 and the second chip 421 respectively, so that the first chip 411 and the second chip 421 work almost simultaneously, and the second chip 421 controls the controlled light sources 423 to light up while the first chip 411 responds to the target card reader. That is, by observing whether the controlled light sources 423 are emitting light, it can be judged whether the first chip 411 has responded to the target card reader.

Herein a number of the controlled light sources 423 is not limited, and may be one or more.

It should be noted that the second winding part 424 is in the edge area 2, and its shape formed by surrounding the central area 1 is not limited. For example, it may be square, round, oval or other shapes. A number of turns made by the second winding part 424 is also not limited, and is dependent on specific application scenarios, for example, it may be one, two or more.

Herein the second winding part 424 and the first winding part 413 are insulated from each other and work independently.

According to the smart card provided by the embodiments of this application, the light-emitting module 42 is arranged on the function layer 4, so that when the cardholder is in payment or other usage scenarios requiring identity identification, the light-emitting module 42 can provide a prompt whether identity identification or payment has been made by the user, which greatly facilitates the user to know the use state of the smart card, thereby largely avoiding the user from making payment or repeating payment without knowledge, which facilitates reducing property losses and ensuring property safety.

In addition, the first coil 412 and the second coil 422 of this application are insulated, work independently of each other, and provide power for the first chip 411 and the second chip 421 respectively, with little mutual influence and high reliability; and the difficulty of manufacturing process is reduced, and thus is convenient for production.

In some optional embodiments, the number of the controlled light sources 423 is multiple, and the light-emitting state comprises at least one of the light-emitting sequence, light-emitting duration, light-emitting color, flickering frequency or luminance of different controlled light sources 423, i.e., the light-emitting state may be any one of them, or a combination of any two, three or more. The second chip 421 controls the controlled light sources 423 to be in the above-mentioned light-emitting state, so that the user can clearly know whether the smart card is in the payment state or in the use state.

For example, when the smart card is a transportation card, the light-emitting color of the smart card is yellow and the light flickers twice while the user swipes the card to get in or out of the subway station. When the smart card is a transaction card, the multiple controlled light sources 423 are turned on in sequence in different colors to remind the user that the transaction is taking place at this time. For example, red, blue, green and yellow light sources are turned on and then turned off. Optionally, the multiple controlled light sources 423 flicker twice or three times at the same time.

Optionally, the controlled light sources 423 are LED lamps. Of course, the controlled light sources 423 may also be other kinds of lamps, and are not limited in this application.

In some optional embodiments, the function layer 4 comprises a first coil layer 43 and a second coil layer 44 which are stacked, wherein the first coil layer 43 is located between the second coil layer 44 and the first protection layer 3. The first winding part 413 is located in the first coil layer 43, the second winding part 424, the controlled light source 423 and the second chip 421 are located in the second coil layer 44, and the controlled light sources 423 and the second chip 421 partially extend to the first coil layer 43. The first winding part 413 and the second winding part 424 are arranged in different layers, which largely avoids them from affecting each other and improves the reliability. In addition, it reduces the manufacturing difficulty, and thus is convenient for production. In addition, by arranging the first winding part 413 and the second winding part 424 in different layers, the degree of freedom of arrangement can be increased, and without the need to consider the size factor, the wiring difficulty can be reduced.

Further, the light-emitting module 42 also comprises a circuit board 426, and the second chip 421 and the controlled light sources 423 are electrically connected to the circuit board 426. The second chip 421 and a plurality of controlled light sources 423 are arranged on the circuit board 426. Optionally, the first chip 411 and the second chip 421 are arranged on the circuit board 426 together. Of course, the first chip 411 may also be arranged on another circuit board.

Further, the second coil layer 44 is provided with a mounting hole, and the side of the first coil layer 43 close to the second coil layer 44 is provided with an avoidance hole. The mounting hole corresponds to the avoidance hole in the stacking direction of the smart card to form a mounting position for mounting the light-emitting module 42. The second chip 421, the circuit board 426 and the controlled light sources 423 are located in the mounting hole, and the second chip 421 and the controlled light sources 423 partially extend to the avoidance hole.

It should be noted that the mounting hole may be a blind hole or a through hole.

In other optional embodiments, the second chip 421, the circuit board 426 and the controlled light sources 423 are only located in the second coil layer 44 and do not extend to the first coil layer 43.

Further, an orthogonal projection of the first winding part 413 on the second coil layer 44 is around the periphery of the second winding part 424. In this way, the second winding part 424 with a smaller size can get less energy from the target card reader, thus preventing the read-write distance of the read-write module 41 from dropping too much and affecting the user experience.

Optionally, the orthogonal projection of the first winding part 413 on the second coil layer 44 covers the second winding part 424. That is, the shape and size of the first winding part 413 and the second winding part 424 are approximately identical.

Optionally, the orthogonal projection of the first winding part 413 on the second coil layer 44 covers the second winding part 424 along the circumferential direction of the second winding part 424. That is, when the shape of the first winding part 413 and the second winding part 424 are approximately the same, the size of the first winding part 413 is slightly larger than that of the second winding part 424 or the size of the second winding part 424 is slightly larger than that of the first winding part 413, so that the projections of the two parts on the second coil layer 44 overlap.

The above is about the situation where the first winding part 413 and the second winding part 424 are arranged in different layers. When the first winding part 413 and the second winding part 424 are located in the same layer, optionally, the first winding part 413 is arranged around the periphery of the second winding part 424. In this way, the energy obtained by the second winding part 424 can be reduced, thus preventing the read-write distance of the read-write module 41 from reducing too much and affecting the user experience, and meanwhile, and the overall thickness of the smart card can be reduced and the user experience can be improved.

In some embodiments, the smart card further comprises a first printed layer 6 between the first protection layer 3 and the function layer 4 and a second printed layer 7 between the function layer 4 and the second protection layer 5. The first printed layer 6 and the second printed layer 7 are arranged on both sides of the function layer 4 to form patterns on both sides of the smart card, which play a role of identification and increase the aesthetic performance of the smart card.

Further, the first printed layer 6 comprises a first light-shielding part and a first light-transmitting part, wherein the first light-transmitting part is arranged in an orthogonal projection area of the light-emitting module 42 on the first printed layer 6; and/or, the second printed layer 7 comprises a second light-shielding part and a second light-transmitting part, wherein the second light-transmitting part is arranged in an orthogonal projection area of the light-emitting module 42 on the second printed layer 7. The first light-shielding part and the first light-transmitting part are alternately arranged, and the second light-shielding part and the second light-transmitting part are alternately arranged. The light-emitting module 42 emits light through the first light-transmitting part and/or the second light-transmitting part.

Optionally, the first light-transmitting part is provided with stereoscopic graphics and texts or concave graphics and texts, and/or, the second light-transmitting part is provided with stereoscopic graphics and texts or concave graphics and texts. By providing stereoscopic graphics and texts or concave graphics and texts, the corresponding patterns or characters can be displayed when the light is transmitted, so as to play the role of identification or increase the aesthetic performance. Optionally, the stereoscopic graphics and texts or concave graphics and texts may be obtained through 3D printing. Of course, they may also be made in other ways, which is not limited here in this application.

Specifically, the texts may be set to "paying", and when the user is paying, he/she can clearly see the state of the smart card. So the texts can play the role of reminding the user of the state.

In some embodiments, the function layer 4 further comprises a third protection layer 45 and a fourth protection layer 46, wherein the third protection layer 45 is located on one side of the first printed layer 6 away from the first protection layer 3 and the fourth protection layer 46 is located on one side of the second printed layer 7 away from the second protection layer 5.

The materials of the first protection layer 3, the second protection layer 5, the third protection layer 45 and the fourth protection layer 46 are not limited, and may optionally be plastic, and of course, other materials may also be used. The first protection layer 3 and the second protection layer 5 are used to protect the first printed layer 6 and the second printed layer 7, and the third protection layer 45 and the fourth protection layer 46 are used to protect the first coil layer 43 and the second coil layer 44.

In some optional embodiments, the first chip 411 is arranged in an accommodating hole (not shown in the figure) penetrating the first protection layer 3, the first printed layer 6, the third protection layer 45, the first coil layer 43, the second coil layer 44 and the fourth protection layer 46. The thickness of the first chip 411 is not limited in this application, and the layer structure where the first chip 411 is located may be determined according to the specifications of the first chip 411 and the size of the smart card. For example, the first chip 411 may also be arranged in the accommodating hole penetrating at least part of the layer structure of the first protection layer 3, the first printed layer 6, the third protection layer 45, the first coil layer 43, the second coil layer 44 and the fourth protection layer 46, and specifically, the first chip 411 may be arranged in the accommodating hole penetrating the third protection layer 45, the first coil layer 43, the second coil layer 44 and the fourth protection layer 46.

Although this application has been described with reference to the preferred embodiments, various improvements may be made and the components may be replaced with equivalents, and especially, as long as there is no structural conflict, the technical features mentioned in various embodiments may be combined in any way without departing from the scope of this application. This application is not limited to the specific embodiments disclosed herein, but comprises all technical schemes within the scope of the claims.

The invention claimed is:

1. A smart card, comprising: a central area and an edge area surrounding the central area, wherein the card comprises a first protection layer, a function layer and a second protection layer which are sequentially stacked, wherein the function layer comprises:
a read-write module, comprising a first chip and a first coil, wherein the first chip is located in the central area, and the first coil comprises a first winding part arranged around the central area and first electrical connection terminals extending from the first winding part to the central area, wherein the first electrical connection terminals are electrically connected with the first chip; and
a light-emitting module, comprising a second chip, a second coil and controlled light sources, wherein the second chip is located in the central area, and the second coil comprises a second winding part arranged around the central area and second electrical connection terminals extending from the second winding part to the central area, wherein the second winding part is insulated from the first winding part, and the second electrical connection terminals and the controlled light sources are electrically connected with the second chip respectively; and the second chip is used to control light-emitting states of the light sources.

2. The smart card according to claim 1, wherein the function layer comprises a first coil layer and a second coil layer which are stacked, and the first coil layer is located between the second coil layer and the first protection layer; and
the first winding part is located in the first coil layer, and the second winding part, the controlled light sources and the second chip are located in the second coil layer, and the controlled light sources and the second chip partially extend to the first coil layer.

3. The smart card according to claim 2, wherein the second coil layer is provided with a mounting hole, a side of the first coil layer close to the second coil layer is provided with an avoidance hole, and the second chip and the controlled light sources are located in the mounting hole and partially extend to the avoidance hole.

4. The smart card according to claim 3, wherein the light-emitting module further comprises a circuit board arranged in the mounting hole, and the second chip and the controlled light sources are electrically connected to the circuit board.

5. The smart card according to claim 2, wherein an orthogonal projection of the first winding part on the second coil layer is arranged around the periphery of the second winding part, or, the orthogonal projection of the first winding part on the second coil layer covers the second winding part, or, the orthogonal projection of the first winding part on the second coil layer partially covers the second winding part along a circumferential direction of the second winding part.

6. The smart card according to claim 1, wherein the first winding part is arranged around the periphery of the second winding part.

7. The smart card according to claim 1, wherein a number of the controlled light sources is multiple, and the light-emitting state comprises at least one of light-emitting sequence, light-emitting duration, light-emitting color, flickering frequency or luminance of different controlled light sources.

8. The smart card according to claim 1, further comprising a first printed layer and a second printed layer, wherein the first printed layer is located between the first protection layer and the function layer, and the second printed layer is located between the function layer and the second protection layer.

9. The smart card according to claim 8, wherein the first printed layer comprises a first light-shielding part and a first light-transmitting part, and the first light-transmitting part is arranged in an orthogonal projection area of the light-emitting module on the first printed layer; and/or
the second printed layer comprises a second light-shielding part and a second light-transmitting part, and the second light-transmitting part is arranged in the orthogonal projection area of the light-emitting module on the second printed layer.

10. The smart card according to claim 8, wherein the function layer further comprises a third protection layer and a fourth protection layer,
the third protection layer is located on one side of the first printed layer away from the first protection layer, and the fourth protection layer is located on one side of the second printed layer away from the second protection layer.

* * * * *